United States Patent
Brand et al.

[11] 3,791,578
[45] Feb. 12, 1974

[54] PILOT-OPERATED STEAM TRAPS

[75] Inventors: Warren H. Brand, Blue Bell; John Scott, Jr., Huntingdon Valley, both of Pa.

[73] Assignee: Yarway Corporation, Blue Bell, Pa.

[22] Filed: Apr. 19, 1972

[21] Appl. No.: 245,540

Related U.S. Application Data

[63] Continuation-in-part of Ser. No. 136,493, April 22, 1971, abandoned.

[52] U.S. Cl............................ 236/54, 236/86, 251/38
[51] Int. Cl................................................. F16t 1/02
[58] Field of Search...... 236/34, 86, 80, 56; 251/38, 251/37

[56] References Cited
UNITED STATES PATENTS

| 688,283 | 2/1901 | Bickel | 236/54 |
|---|---|---|---|
| 688,283 | 12/1901 | Bickel | 236/54 |
| 1,588,919 | 6/1926 | Telfer | 236/54 |
| 1,848,031 | 3/1932 | Spencer | 236/80 |
| 1,807,191 | 5/1931 | Boyle | 251/38 X |
| 2,017,840 | 10/1935 | Brooks | 251/38 |
| 2,271,850 | 2/1942 | Zinkil | 236/80 |

FOREIGN PATENTS OR APPLICATIONS

| 734,832 | 8/1955 | Great Britain | 236/80 |

*Primary Examiner*—William E. Wayner
*Attorney, Agent, or Firm*—John W. Logan, Jr.

[57] ABSTRACT

A steam trap having a main valve member mounted in a control chamber and operable to afford and block fluid flow through the trap in response to actuation of a pilot valve by a thermal responsive element mounted on the main valve member is provided with means on the main valve member to channel a quantity of control fluid across the thermal responsive element for improving the response of the steam trap to changes in the temperature of the fluid flowing through the trap. In the illustrated embodiment, a quantity of control fluid is flowed upwardly through a passage around the periphery of the main valve member from the trap inlet and then past the thermal responsive element and through a central passage in the main valve to the trap outlet. Changes in the temperature of the control fluid expands and contracts the thermal responsive element to actuate the pilot valve for applying pressure forces on the main valve to cause the main valve member to engage and disengage its seat. Satisfactory performance of the trap is insured when the restriction to flow of the central passage in the main valve member is less than the restriction to flow of the peripheral passage of if the capability for mass flow through the central flow passage is greater than the capability for mass flow through the peripheral flow passage, taking into account the pressure differential across each of these flow passages. In another illustrated embodiment the thermal controlled pilot valve controls operation of a second pilot valve which in turn controls operation of the main valve to provide a multi-stage control of flow of condensate.

7 Claims, 6 Drawing Figures

FIG. 3.
FIG. 4.
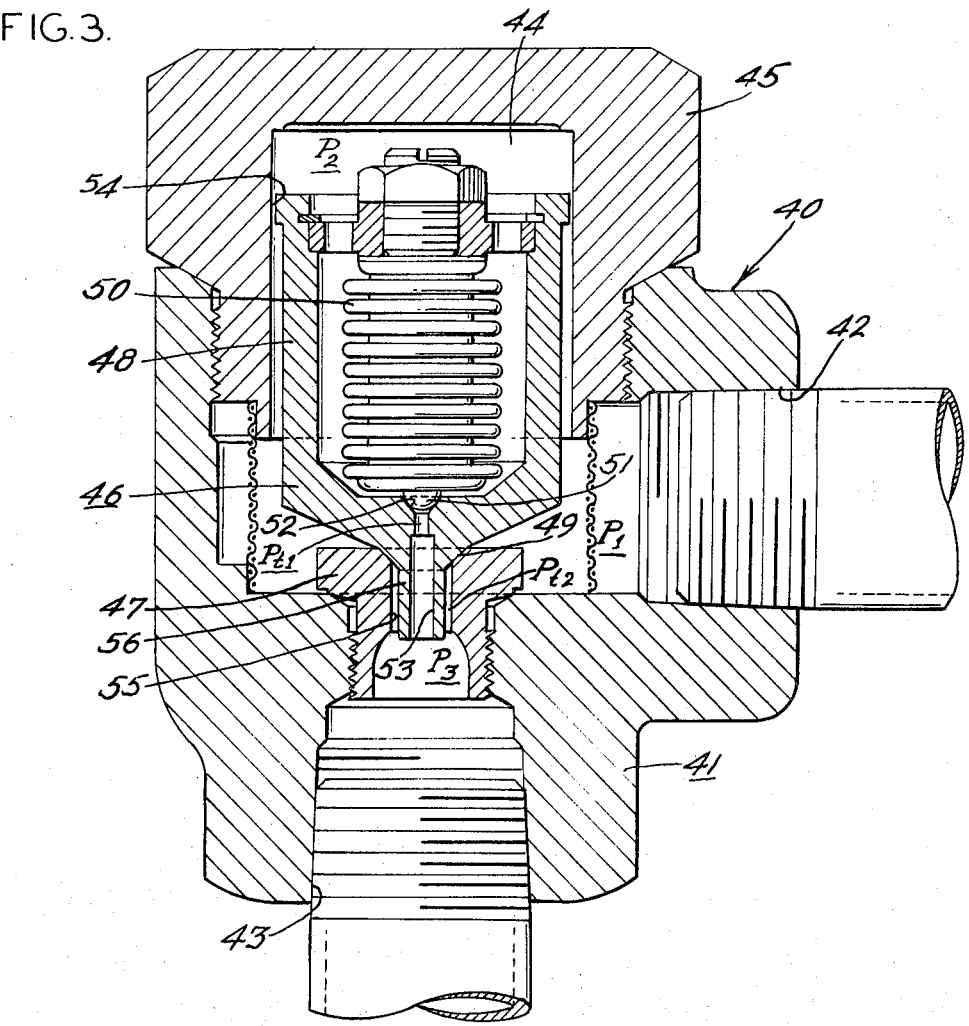
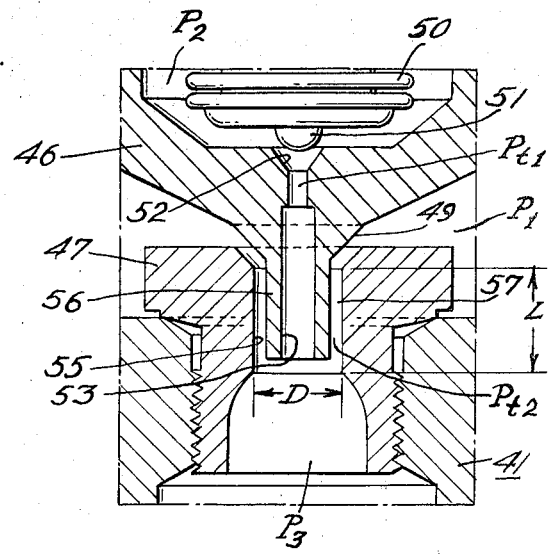

PILOT-OPERATED STEAM TRAPS

This application is a continuation-in-part of our co-pending application Ser. No. 136,493, filed Apr. 22, 1971, now abandoned.

The present invention relates to steam traps, and more particularly, the present invention relates to pilot-operated steam traps.

Pilot-operated steam traps are known for draining condensate from steam lines. Examples of such traps are disclosed in U.S. Pats. Nos. 3,478,961; 2,757,870; 688,282; 668,766; 1,326,898; and Canadian Pat. 595,867. Although the aforementioned patented steam traps may operate satisfactorily, none is as economical to manufacture as desired; nor is any of simple but rugged construction. Moreover, a steam trap which is responsive to changes in the temperature of flowing condensate and which is quiet in operation is highly desirable.

With the foregoing in mind, it is a primary object of the present invention to provide an improved steam trap of the pilot-operated type.

It is another object of the present invention to provide a pilot-operated steam trap with certain unique dimensional relations which improve the operation of the trap.

As another object, the present invention provides a novel pilot-operated steam trap which is of relatively simple but rugged construction and which is relatively economical to manufacture and maintain.

It is a further object of the present invention to provide a pilot-operated steam trap with a novel structure which operates to improve the responsiveness of the trap to changes in fluid temperatures while enabling the trap to operate in a quiet manner.

A still further object of the present invention is to provide an improved pilot-operated steam trap having a broad range of operation permitting the flow of a large quantity of condensate during start-up of a system and thereafter permitting control of a smaller quantity of condensate.

Still a further object of the present invention is to provide a novel pilot-operated steam trap with a multi-stage pilot operation providing the steam trap with control over a wide range of flow and further provides the steam trap with a greater predictability of flow.

Another object of the present invention is to provide a novel pilot-operated steam trap in which a relatively small thermal responsive element exerting relatively small forces can control the operation of a large valve member.

A further object of the present invention is to provide a novel steam trap which can handle and control both large and small flows of condensate and which have a plurality of valve seating members appropriately dimensioned to handle the load placed on the trap over a wide range of flow rates.

A still further object of the present invention is to provide improvements in pilot-operated steam traps in which there is always an unbalanced pressure across the pilot in all open positions of the valve to insure some continued flow of fluid past the thermal control element.

More specifically, in the present invention there is provided a pilot-operated steam trap having a thermally-responsive pilot valve which is operable in response to an increase in the temperature of fluid flowing through the trap to actuate a main valve for blocking fluid flow therethrough and which is operable in response to a decrease in the temperature of fluid flowing through the trap to actuate the main valve for affording fluid flow through the trap. A primary of main valve seat is located between the inlet and outlet of the trap, and main valve member is mounted for displacement into and out of engagement with the seat. A first flow passage is located peripherally of the main valve member connecting the inlet with a control chamber, and a second flow passage is located centrally in the main valve member and connects the control chamber and the outlet. A pilot valve depending from a temperature responsive element carried by the main valve member operates to close the second flow passage to create pressure forces in the control chamber for closing the main valve upon an increase in the temperature of control fluid flowing through the chamber and operates to reduce closing pressure forces in the control chamber for opening the main valve upon a decrease in control fluid temperature. In order to insure satisfactory performance of the steam trap, the restriction to flow under existing operating conditions of the second or central flow passage must be less than the restriction to flow of the first or peripheral flow passage, or the mass flow capability of the second or central flow passage taking into account the pressure differential existing across the second or central flow passage should be greater than the mass flow capability of the first or peripheral flow passage taking into account the pressure differential existing across the first or peripheral flow passage.

These and other objects, features and advantages of the present invention should become apparent from the following descriptions when taken in conjunction with the accompaning drawing in which:

FIG. 3 is an enlarged sectional view similar to FIG. 1 illustrating a modified form of steam trap of the present invention;

FIG. 4 is an enlarged fragmentary sectional view of the trap of FIG. 3 with the pilot and main valve in an open position;

Figure 1:
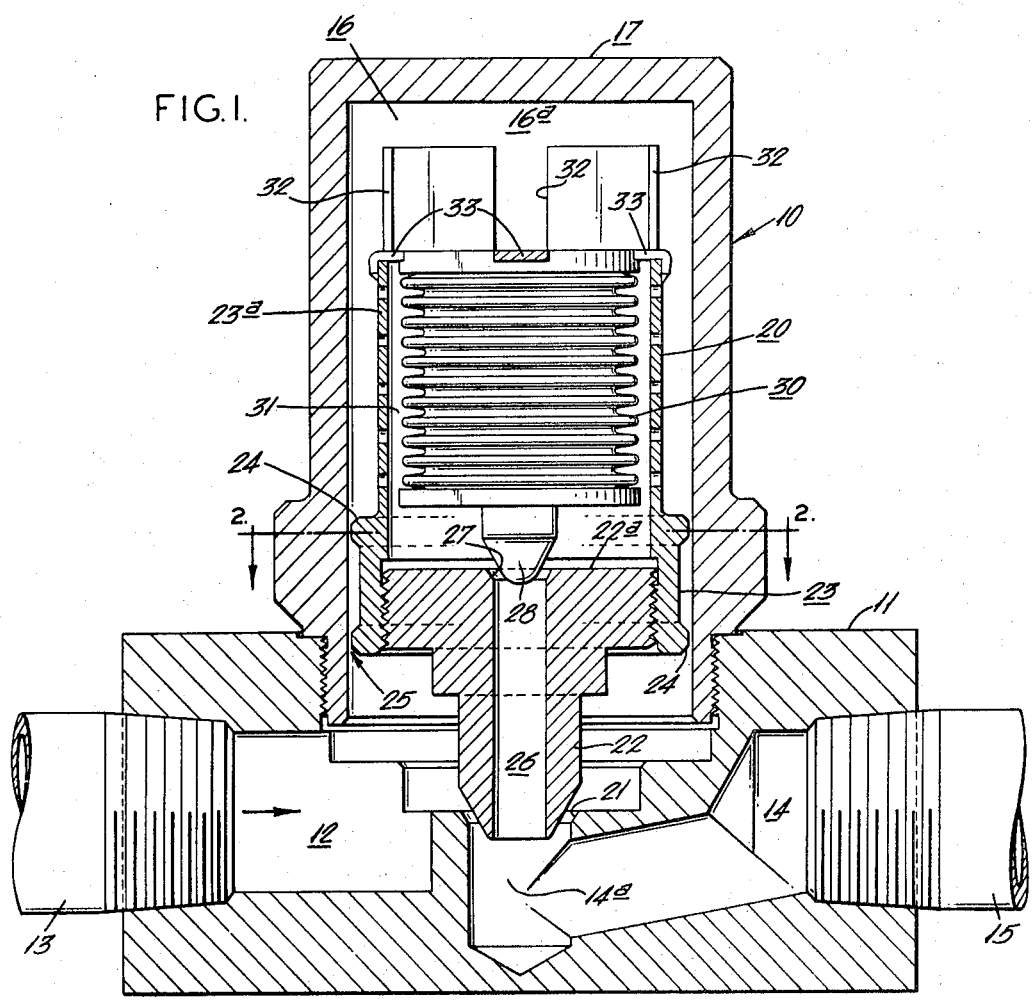
FIG. 1 is an enlarged sectional view of a pilot-operated steam trap embodying the present invention.

Referring now to the drawings, there is illustrated in FIG. 1. a steam trap 10 which embodies the present invention. As may be seen therein, the steam trap 10 has a body 11 with an internally threaded inlet 12 adapted to be connected to a pressurized steam line 13 from which condensate is to be drained and an internally-threaded outlet 14 adapted to be connected to a suitable condensate sump line 15. A control chamber 16 is provided intermediate the inlet 12 and outlet 14 by means of an upstanding cylindrical bonnet 17 mounted in a recess in the upper side of the body 11, and in the present instance, the longitudinal center line of the control chamber 16 is disposed coaxially with an upturned portion 14a of the outlet 14.

For the purpose of selectively affording and blocking a main steam of condensate or vapors flow through the trap 10, a main valve assembly 20 is provided. The main valve assembly 20 coacts with a main valve seat 21 surrounding an upturned portion 14a of the outlet 14, and in the illustrated embodiment, the main valve assembly comprises a plunger 22 adapted to engage the seat 21 and a piston 23 mounting the plunger 22 at its upper end. The piston 23 is mounted for axial displacement in the bonnet 17 and has at least one continuous circumferentially extending axially spaced rib 24 which confront the inside of the bonnet and which operate to prevent cocking and jamming of the piston 23 in the bonnet 17. In the present instance, the plunger 22 is threaded mounted in an internally threaded bore in the base of the piston 23 to afford ready removal and replacement of the plunger 22 should it become worn or damaged.

In the present invention, the main valve assembly 20 is displacd axially in response to the application of pressure forces on opposite sides thereof. To this end, a first flow passage 25 is provided between the periphery of the piston 23 and the inside of the bonnet 17 to afford fluid communication between the inlet 12 and the upper portion 16a of the control chamber for permitting a quantity of control fluid to flow upwardly into the upper portion 16a of the control chamber. In the present instance, the passage 25 is continuous about the periphery of the piston and extends axially therealong. A second flow passage 26 is provided centrally in the plunger 22 to affort fluid communication between the outlet 14 and the upper portion 16a of the control chamber 16 for permitting the control fluid to flow from the upper portion 16a of the control chamber 16 and into the outlet 14. A valve seat 27 surrounds the flow passage 26 at its intersection with the upper surface 22a of the plunger, and a pilot valve 28 overlies the seat 27 and is displaceable into engagement therewith to block the flow of control fluid through the central passage 26. As illustrated in FIG. 1, the pilot valve 28 is spaced from its seat 27, venting pressure in the control chamber causing pressure at the trap inlet 12 to act upwardly on the bottom of the valve assembly 20 for unseating the plunger 22 and thereby affording flow of the main stream of fluid through the trap 10.

For the purpose of displacing the pilot valve 28 into and out of engagement with its seat 27, a temperature responsive element 30 is mounted in the upper portion 16a of the control chamber 16. In the present instance, the temperature responsive element 30 is carried by the piston 23 and the pilot valve 28 depends centrally from the element 30 to register with its seat 27 in the top side of the plunger 22. With this structure, an increase in the temperature of fluid flowing through the trap 10 causes the element 30 to expand and the pilot valve 28 to engage its seat 27. As a result, control fluid flowing upwardly through the passage 25 enters the upper portion 16a of the control chamber 16 and applies a downward force on the main valve assembly 20 causing the plunger 22 to engage its seat 21 and thereby blocking the main flow of condensate through the trap 10. Conversely, a decrease in the temperature of fluid flowing through the trap causes the temperature responsive element 30 to contract and the pilot valve 28 to disengage its seat 27. As a result, control fluid is permitted to flow downwardly through the passage 26 for reducing the downward closing force on the main valve assembly 20 to enable fluid pressure at the inlet 12 to apply an upward force on the main valve assembly 20 for permitting the plunger 22 to disengage its seat 21 and thereby afford main flow of condensate through the trap 10. It is noted that even though a pressure drop occurs across the peripheral passage 25, the effective area of the upper surface of the main valve assembly 20 against which a lower pressure is applied is greater than the area on the lower surface of the main valve assembly confronting inlet pressure, thereby creating the net downward force which is sufficient to block flow of the main stream of fluid through the trap 10.

In accordance with the present invention, means is provided to channel the control fluid around the temperature responsive element 30 to cause the element accurately to sense the temperature of the main stream to condensate fluid flowing through the trap 10. To this end, an upstanding hollow cylindrical projection 23a is provided on the main valve assembly 20, and the element 30 is mounted therein. In the present instance, the projection 23a is integral with the piston 23 and is coextensive in length with the element 30. A clearance passage 31 is provided peripherally of the element 30 and along its length to permit control fluid to flow around the element 30 and the projection 23a before exiting through the passage 26. Control fluid is permitted to flow into the clearance space 31 through a series of vents 32, 32 provided in the upper portion of the piston projection 23a above the top of the element 30 and through perforations in the side of the projection 23a.

In the illustrated embodiment, the element 30 is mounted in the piston projection 23a by means of arms 33, 33 which extend radially outward in equally spaced intervals and which engage the bottoms of the vents 32, 32. Each arm 33 has a downturned end which is fastened to the outside of the piston-extension 23a, for example, by welding. Preferably, the longitudinal dimension of the piston-extension 23a is selected so as to cause its top edge to engage the underside of the top of the bonnet 17 when the plunger 22 is spaced from its seat. Thus, the piston-extension 23a serves the dual function of channeling control fluid downwardly around the element 30 and of limiting the upward displacement of the main valve assembly 20 in the control chamber 16. In addition, the cup-like structure of the piston 23 tends to compress fluid in the upper portion 16a of the chamber during sudden upward motion of the valve assembly 20, thereby absorbing some of the shock and hence noise which would otherwise be generated if the top edge of the piston extension 23a were to strike the inside of the bonnet 17 in the absence of cushioning.

It has been found that certain advantages are realized when the central passage 26 in the plunger 22 is dimensioned so as to provide a lesser resistance to flow than the peripheral flow passage 25. For example, prior to opening of the main valve 20 in response to a decrease in the temperature of flowing fluid, the pilot valve opens and permits the control fluid to flow downwardly through the central passage 26 and to the outlet 14. Thus, in situations where the rate of formation of condensate is relatively low, the pilot valve can, in some instances, handle the entire condensate load. However, during start up of a system the main valve will open permitting a large quantity of condensate to be quickly discharged. Thereafter, the pilot valve can handle the relatively smaller quantities of condensate. It is also to be noted that a pilot operated steam trap having the above noted structure and dimensional relations provides condensate drainage at temperatures close to steam saturation temperatures.

In this illustrated embodiment of the invention, the capability for mass flow through the central opening 26 when the pilot valve is fully open is greater than the capability for mass flow through the peripheral flow passage 25 thus permitting the previously described decrease in pressure in the control chamber and also permitting the trap to operate under all conditions of back pressure, fluid state and temperatures.

Preferably, the pilot valve is designed so that when fully open it has a capacity equal to 10 to 25 percent of the capacity of the main valve. With this arrangement, low rates of flow of condensate through the steam trap are handled solely by the pilot valve. In steam traps of this type, the trap is designed to handle the maximum rate of flow of condensate which might be expected in the system to which the steam trap is applied. In the normal system this maximum rate of flow would occur primarily during the time the system is starting operation. Thereafter, the required rate of flow of condensate would be much less. A valve such as a steam trap can properly control low rates of flow down to about 10 percent of the rated flow. Below that rate of flow there is, at times, insufficient control of the flow. Therefore, the pilot is provided in the present invention which will handle and control this low rate of flow. Preferably, the pilot should be designed to have a capacity equal to 10 percent of the total capacity of the steam trap. This pilot capacity can be as large as 25 percent however.

FIGS. 3 and 4 illustrate a modified form of steam trap including means to control the pressure differential across the main valve and pilot valve and prevent a possible reversal of flow within the control chamber which might harm the thermal control element and further insure a positive continued flow through the control chamber in all open positions of the main valve so that the thermal control element properly responds to fluid temperature within the trap.

In this embodiment of the present invention, the steam trap 40 includes a body 41 having an inlet 42 and an outlet 43. A control chamber 41 is provided in the steam trap between the inlet and the outlet by means of an upstanding cylindrical bonnet 45 mounted in a recess provided in the upper side of the body 41. To permit control over the flow of condensate through the steam trap, a main valve assembly 46 is provided which is adapted to seat on a valve seat 47 secured to the steam trap body immediately upstream of the outlet 43.

The main valve assembly 46 includes a generally hollow cylindrical piston or cage 48 terminating at its lower end in a generally conical valve portion 49. The piston 48 is mounted for displacement axially of the control chamber 44 and in one position engages the valve seat 47 to prevent fluid flow across the valve seat while in the other position disengages from the valve seat to permit flow.

Figure 2:
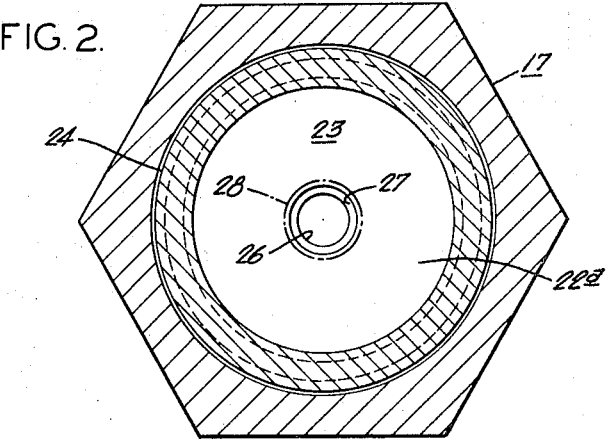
FIG. 2 is a sectional view taken along line 2—2 of FIG. 1.

Operation of the main valve assembly 46 of this embodiment of the present invention is similar to that set forth in connection with operation of the main valve assembly 20 of the embodiment of FIGS. 1 and 2. As the temperature within the control chamber 44 drops, the thermal responsive element 50 will lift the pilot valve 51 off the pilot valve seat 52 permitting flow through the channel 53 in the main valve assembly 46 to the outlet. As in the prior embodiment, when the flow area or rate of mass flow through the pilot becomes larger than the clearance area 54 or rate of mass flow between the bonnet 45 and main valve assembly, the main valve assembly will open. Similarly, when the temperature in the control chamber increases as would occur at the end of the condensate discharge, the pilot valve and main valve close in the same manner as described in the previous embodiment.

An important feature of the embodiment of the present invention resides in the control of pressure in the control chamber relative to the system pressure to prevent sudden surges of pressure in the control chamber and to insure continued flow of fluid through the control chamber after the main valve opens. To accomplish this an elongated opening 55 is provided extending through the center of the main valve seat 47 and the main valve element 46 terminates in an elongated tip 56 positioned centrally of the opening 55. This provides an elongated annular passage 57 in all open positions of the main valve between the tip 56 and walls of the opening 55 through which the main flow of condensate mut pass. Condensate flow is thus controlled by the ratio of the clearance space and length of the passage 57. Preferably, the length L of the passage 57 should equal approximately the diameter D of the passage. Also, when the main valve is fully lifted the tip 56 should be inserted in the passage 57 a distance between approximately one half to one times the diameter D.

With reference to FIGS. 3 and 4, $P_1$ represents the inlet pressure. $P_2$ represents the control chamber pressure, $P_3$ the outlet pressure and $P_{t1}$ and $P_{t2}$ the throat pressures in the pilot valve outlet throat and main valve outlet throat respectively. In normal operation when both the pilot and main valves are closed $P_2$ equals $P_1$. In a construction without the valve tip 56 within the elongated passage 57 when the pilot valve opens a throat pressure $P_{t1}$ is developed which is related to liquid temperature and corresponds to the vapor pressure of the liquid. The chamber pressure $P_2$ will drop to a pressure approaching $P_{t1}$ and as this pressure is sufficiently reduced, the main valve will open. Upon opening of the main valve and without the use of the tip 56 $P_3$ will approximately equal $P_1$ and the throat of the pilot will be exposed to pressure $P_3$ and $P_1$. This will increase $P_{t1}$ and $P_2$ to a pressure approaching $P_3$. Thus insufficient differential pressure will exist between the control chamber 44 and the outlet 43 minimizing flow through the control chamber. Without adequate flow the thermal element will not respond in a predictable manner and will lag behind actual temperature changes in the trap. Also, the change in pressure in the control chamber from $P_2$ to $P_3$ can be sufficiently rapid to cause possible damage to the thermal element if the thermal element comprises a bellows as shown in the drawings.

The raising of control chamber pressure $P_2$ to the line pressure $P_1$ is prevented by the construction of FIG. 3. With this construction the outlet pressure $P_3$ is maintained substantially below $P_1$ so that $P_1$ is always greater than $P_2$ when the pilot valve is open thereby causing flow into the control chamber through the restriction at 54. With the construction of FIGS. 3 and 4, throat pressures $P_{t1}$ and $P_{t2}$ exist when the pilot and main valves are open which are nearly equal to the vapor pressure of the liquid flowing through these throats.

These pressures $P_{t1}$ and $P_{t2}$ vent to the outlet and thus limit the maximum value of $P_3$ to a pressure approximating $P_{t1}$ and $P_{ts}$. Accordingly, with this construction, the pressure $P_2$ is kept at a low limit preventing damage to the bellows, flow is maintained through the control chamber and the chamber pressure and total flow through the trap can be readily predicted.

To summarize the above, there is provided in the steam trap of this embodiment means to provide a restriction to flow past the main valve in all open positions of the main valve to create a pressure drop across the main valve from the inlet to the outlet. There is also provided means to create a pressure drop from the inlet to the control chamber and means in the pilot valve flow passage to create a pressure drop from the control chamber to the outlet. The pressure drop from the inlet to the control chamber must be sufficient to permit the pressure differential to unseat the main valve member. The pressure drop from the control chamber to the outlet must be sufficient to permit adequate flow through the control chamber when the main valve is open so that the thermal element responds to the actual temperature of the condensate and will not lag behind the actual temperature of the condensate passing through the main valve. Because of the existence of a pressure drop from the inlet to the control chamber sufficient to cause the main valve to open, the pressure drop from the control chamber to the outlet will necessarily be substantially less than the pressure drop from the inlet to the outlet and there will be continued flow through the control chamber in all open positions of pilot valve and the main valve.

Preferably, the pilot valve is designed so that when fully open it has a capacity equal to 10 to 25 percent of the capacity of the main valve. With this arrangement, low rates of flow of condensate through the steam trap are handled solely by the pilot valve, thus providing a better control over the flow of condensate.

Figure 5:
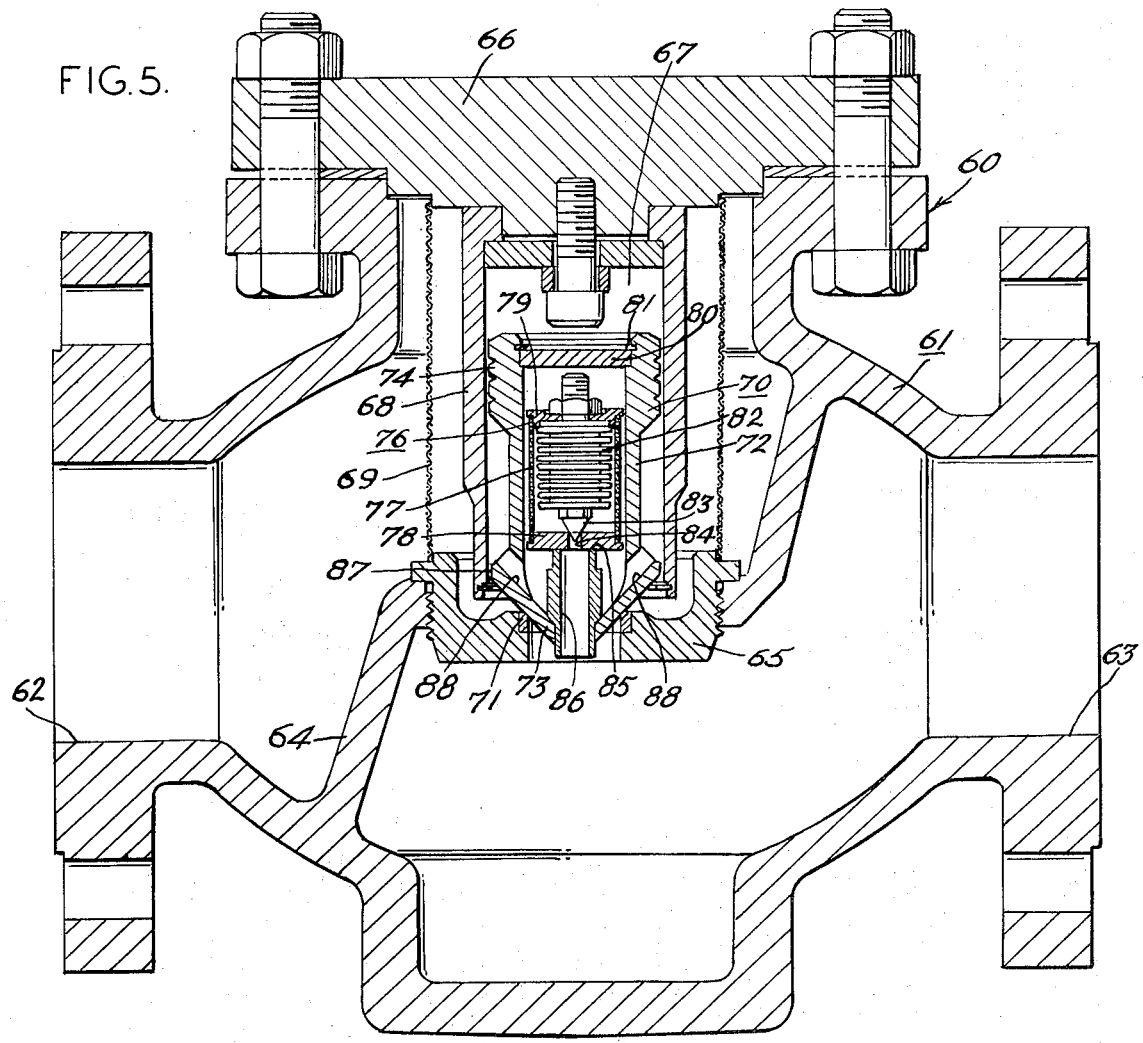
FIG. 5 is an enlarged sectional view of a steam trap with a multi-stage pilot valve.
Figure 6:
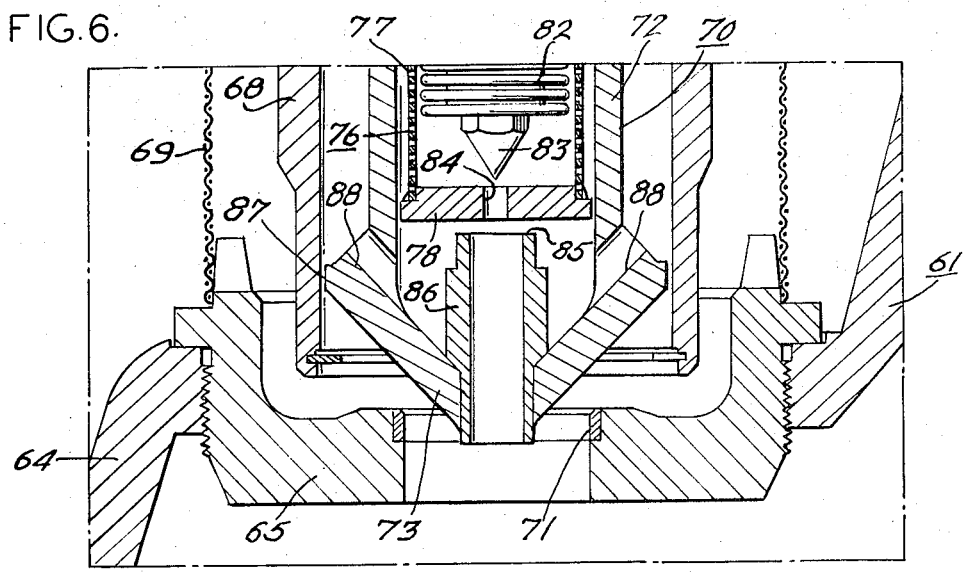
FIG. 6 is an enlarged fragmentary sectional view of the trap of FIG. 5 in an open position.

FIGS. 5 and 6 illustrate a further modified form of steam trap of the present invention utilizing a multiple stage pilot valve. This form of the invention provides excellent control of flow over an extremely wide range of flow.

With reference to FIGS. 5 and 6, the steam trap 60 includes a body portion 61 which is similar to a conventional globe valve body with an inlet 62 and an outlet 63 separated from each other by a web 64 having a central opening which receives a valve seat 65. The open upper end of the body 61 is adapted to be sealed by a removable flange plate or cap 66. A control chamber 67 is provided within the body intermediate the inlet and outlet by means of a cylindrical sleeve 68 removably secured to the cap, for example, as shown in FIG. 5. If desired, a cylindrical perforated screen 69 may be provided surrounding the sleeve 68 extending between the valve seat and cap to prevent solid particles from interferring with operation of the trap.

To permit control over the flow of condensate through the steam trap, a main valve assembly 70 is provided which is adapted to seat on a valve seat insert 71 in the main valve seat 65. The main valve assembly 70 includes a hollow piston or cage 72 which terminates at its lower end in a generally conical valve portion 73. The piston 72 is carried within the sleeve 68 for sliding axial movement toward and away from the valve seat 65, so that in one limit position it engages the valve seat and prevents fluid flow across the valve seat while in the other limit position it is spaced from the valve seat, for example, as shown in FIG. 6 to permit free fluid flow across the valve seat. Projecting outwardly from the upper end of the piston 70 are a series of circumferential ribs 74 which guide movement of the piston 72 within the sleeve 68.

Positioned within the piston 72 is the pilot valve assembly 76 which includes a perforated cylinder 77 secured at its lower end to a circular valve disc 78 and at its upper end to a circular support plate 79. The pilot valve assembly is mounted for axial movement within the piston 72 with its upper limit of movement relative to the piston 72 being controlled by a retaining plate 80 removably secured in place within the upper end of the piston 72 against a small shoulder by a split ring 81.

Adjustably mounted on the retaining plate 79 and positioned within the perforated cylinder 77 of the pilot valve assembly is a thermal responsive element 82 which in the present instance is illustrated in the form of a bellows and which carries at its lower end a conical first pilot valve 83. This first pilot valve 83 is adapted to engage and seal a valve opening 84 within the valve disc 78. The thermal responsive element 82 is adjusted relative to the upper support plate 79 so that when the temperature within the control chamber approaches the saturation temperature of the fluid the first pilot valve 83 is seated within the central opening of the valve plate 78. As the temperature in the control chamber drops, the thermal responsive element contracts moving the valve 83 away from the opening 84 and permitting fluid flow thrugh the opening 84. This is the first stage of the multi-stage valve incorporated in the steam trap of this embodiment of the invention.

The second stage of the pilot valve is opened after the first stage reaches it fully open position and includes the valve disc 78 which is adapted to seat on a valve seat 85 at the upper end of a hollow cylindrical tube 86 carried by the valve member 73. After the first stage pilot valve 83 is opened, the valve disc 78 will be raised away from its seat 85 as more fully described hereinafter, thereby permitting the second stage of the pilot valve to open. When the second stage of the pilot valve reaches its open position, the main valve 73 will open, also as more fully described hereinafter.

Preferably, the first stage of the pilot valve assembly is designed so that it has a capacity to handle approximately 10 to 25 percent of the total capacity of flow through the second stage of the pilot valve assembly while the second stage of the pilot valve assembly is designed so that it can handle the 10 to 25 percent of the total capacity of flow through the steam trap.

The operation of the steam trap illustrated in FIGS. 5 and 6 of the drawings is generally similar to that set forth in the prior embodiment. When the fluid at the trap is at or near its saturation temperature, the main valve and both stages of the pilot valve are closed and no fluid will flow through the trap. As the temperature within the control chamber 67 drops, the thermal responsive element 82 will lift the first pilot valve 83 off of its seat in the valve disc 78 permitting flow through the opening 84 and through the central opening in the tube 86 to the trap outlet. When the first pilot valve 83 is opened so that the flow area or total capacity for flow past this valve is greater than the flow area or total capacity for flow through the clearance between the peripheral surface of the valve disc 78 and the inner walls of the piston 72, the pressure above the valve disc 78 will drop below that existing beneath the valve disc 78 permitting the valve disc 78 to be raised off of its seat 85 thereby opening the second stage of the pilot valve assembly. In this open condition of the pilot valve assembly condensate is flowing from the inlet through a controlled clearance gap 87 provided between the outer peripheral surface of the conical main valve 73 and the inner wall of the sleeve 68 then through openings 88 in the piston 72 and into the area beneath the pilot valve disc 78. When the pilot valve disc 78 has been elevated to a position in which the area or capacity for fluid flow across the pilot valve seat 85 is greater than the area or capacity for provided by the clearance gap 87, the pressure within the control chamber 67 will drop to a point beneath the inlet pressure permitting the inlet pressure to raise the conical valve member 73 and main valve assembly 70 off its valve seat 65 thereby permitting flow of condensate directly across the main valve seat.

As condensate is discharged from the trap and the temperature within the trap approaches the saturation temperature of the fluid, the thermal responsive element 82 will start expanding closing the first pilot valve 83. This will cause pressure in the chamber above the valve disc 78 to be elevated to a point approaching the inlet pressure and the valve disc 78 will thereupon be moved to its closed position, thus closing the second stage of the pilot valve. As the second stage of the pilot valve approaches its closed position, pressure within the control chamber 67 will be elevated to a pressure approaching the inlet pressure, thereby causing the main valve 73 to be closed. The main valve 73 and the two stages of the pilot valve will remain closed preventing flow of fluid to the trap until the temperature within the trap again starts dropping at which time the above described operation of the trap will be repeated.

In view of the foregoing, it should be apparent that there has now been provided an improved pilot operated steam trap which is of simple but rugged construction, which affords total closure to hot condensation steam, which is relatively quiet in operation, which is quickly responsive to changes in temperature of fluid flowing through the trap and which provides modulated condensate flow for relatively small amounts of condensate accumulation.

While particular embodiments of the present invention have been described in detail, various modifications, alterations and changes may be made without departing from the spirit and scope of the present invention as defined in the appended claims.

We claim:

1. A pilot operated steam trap having a body with an inlet and an outlet, means providing a control chamber carried by said body, main valve seat means provided between said inlet and said outlet, a main valve member mounted in said control chamber for displacement toward and away from said main seat to block and afford fluid flow from the inlet and to the outlet, a first flow passage providing fluid communication between said inlet and said control chamber to permit a quantity of control fluid to flow into said control chamber, second flow passage means providing fluid communication between said outlet and said control chamber to permit said control fluid to flow from said control chamber, a pilot valve cooperable with said second flow passage to afford and block flow of said control fluid therethrough, said pilot valve mounted for movement between a closed and a fully opened position, temperature responsive means in said control chamber to control the position of said pilot valve in response to the temperature in said control chamber, the capacity for total mass flow of said second flow passage when said pilot valve is in its fully opened position being greater than the capacity for total mass flow of said first flow passage so that the main valve member disengages its seat to afford flow through the trap after said pilot valve affords control fluid flow through the second flow passage and when said pilot valve closely approaches its fully opened position, means to provide a restriction to flow past said main valve in all open positions of said main valve to create a pressure drop across said main valve seat from the inlet to the outlet, and means at said second flow passage to provide a restriction to flow to create a pressure drop from said control chamber to said outlet in all open positions of the pilot valve means, the pressure drop from the control chamber to the outlet being substantially less than the pressure drop across said main valve to cause continuous flow of fluid through the control chamber to the outlet in all open positions of the main valve.

2. A pilot valve operated steam trap comprising spaced inlet and outlet chambers and a control chamber intermediate the inlet and outlet chambers, means defining a main valve seat between the inlet and outlet chambers, a main valve member positioned within said control chamber and adapted to seat on said main valve seat to prevent fluid communication between said inlet and said outlet chambers, said main valve member mounted for movement away from said valve seat to an open position, a pilot valve positioned between said inlet and outlet chambers operable to control fluid flow through said inlet and outlet chambers, said pilot valve mounted for movement between a closed and a fully opened position, temperature responsive means positioned within said control chamber and connected to said pilot valve, said temperature responsive means operable to cause said pilot valve to move toward its open position when the temperature in said control chamber is less than a predetermined temperature and close when the temperature of said control chamber is greater than said predetermined temperature, said pilot valve operable to cause opening of said main valve member when the pilot valve closely approaches the full open position thereby allowing condensate to pass through said main valve and operable to cause closing of said main valve member when said pilot valve is moved toward and approaches said closed position to prevent passage of steam through said main valve, means to provide a restriction to flow past said main valve in all open positions of said main valve to create a pressure drop across said main valve seat from the inlet to the outlet, and means at said second flow passage to provide a restriction to flow to create a pressure drop from said control chamber to said outlet in all open positions of the pilot valve means, the pressure drop from the control chamber to the outlet being substantially less than the pressure drop across said main valve seat in all open positions of the pilot valve means and main valve to cause continuous flow of fluid through the control chamber to the outlet in all open positions of the main valve.

3. Apparatus according to claim 2 wherein the pilot valve is of a size to handle between approximately 10 to 25 percent of the total capacity of flow of fluid through the steam trap.

4. A pilot operated steam trap having a body with an inlet and an outlet, means providing a control chamber carried by said body, main valve seat means provided between said inlet and said outlet, means defining a main valve seat flow passage through said main valve seat providing fluid communication between said inlet and said outlet, said main valve seat flow passage having a restricted throat area therein, a main valve member mounted in said control chamber for displacement toward and away from said main seat to block and afford fluid flow from the inlet and to the outlet, the restricted throat area in said main valve seat flow passage operable to create a first pressure drop from said inlet to said outlet in all open positions of said main valve member, a first flow passage providing fluid communication between said inlet and said control chamber to permit a quantity of control fluid to flow into said control chamber, second flow passage means providing fluid communication between said outlet and said control chamber to permit said control fluid to flow from said control chamber, said second flow passage having a restricted throat area therein, a pilot valve moveable from a closed to a full open position cooperable with said second flow passage to afford and block flow of said control fluid therethrough, the restricted throad area in said second flow passage operable to create a second pressure drop from said control chamber to said outlet in all open positions of said pilot valve, said second pressure drop being substantially less than said first pressure drop in all open positions of said main valve member, temperature responsive means in said control chamber to control the position of said pilot valve in response to the temperature in said control chamber, the capacity for total mass flow of said second flow passage when said pilot valve is in its full open position being greater than the capacity for total mass flow of said first flow passage so that the main valve member disengages its seat to afford flow through said main valve after said pilot valve closely approaches its full open position.

5. Apparatus according to claim 4 wherein said main valve seat flow passage comprises an elongated opening extending through said main valve seat, and said main valve member has an elongated tip thereon extending coaxially of and at least partially within said elongated passage, the tip on said main valve member providing an annular flow area surrounding said tip and in said main valve passage through which fluid may flow with said annular area forming in said main valve seat flow passage said restricted throat area.

6. Apparatus according to claim 5 in which said main valve seat flow passage is of generally circular cross-sectional shape and has an axial length approximately equal to its diameter.

7. Apparatus according to claim 6 in which when said main valve member is displaced away from said main valve seat the tip on said main valve member is inserted into said main valve seat flow passage a distance equal to at least approximately one-half of the diameter of said main valve seat flow passage.

* * * * *